Patented Oct. 3, 1944

2,359,378

UNITED STATES PATENT OFFICE 2,359,378

PROCESS FOR THE MANUFACTURE OF DEXTRIN FROM STARCH

Steward G. Morris, Philadelphia, Pa., assignor to Claude R. Wickard, Secretary of Agriculture of the United States of America, and his successors in office No Drawing. Application September 28, 1942, Serial No. 459,970

5 Claims. (Cl. 127—38)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the manufacture of dextrin from starch, and has for its object the provision of a simple and economical procedure for distribution of a mineral acid catalyst throughout granular starch.

In dextrinization of starch by the dry or roasting process, a chemical catalyst, usually a mineral acid such as hydrochloric acid, is added to the starch. In the usual procedure, a water solution of the mineral acid is sprayed or atomized onto the starch as it is being mixed. Various types of atomizers are in use for this purpose.

The quantity of catalyst employed is small. For example, some dextrinizations are made in which a ton of powdered starch contains only one or two pounds of pure hydrochloric acid. One of the principal difficulties encountered in past procedures is the distribution of such a small quantity of catalyst evenly throughout the comparatively large mass of starch.

Regardless of the efficiency of the atomizer used, it is obvious that every starch granule cannot receive a portion of the acid by this method of distribution. Not until the acid is vaporized during the roasting process does it penetrate to every individual starch granule. Meanwhile, those portions of starch having a higher initial concentration of catalyst are being dextrinized. The resulting over-dextrinization of these particles causes excess glucose to be formed. Furthermore, the concentration of catalyst solution in localities is often sufficient to bind adjacent starch granules together, forming lumps which become carbonized in the roasting process to form black specks in the final dextrinized product.

This invention avoids the disadvantages set out above, and is practiced in the following manner:

Air-dried granular starch, which usually contains from 10 to 20 percent moisture, is dried to a moisture content of less than 6 percent, substantially 1 to 4 percent being preferred. If the moisture content is less than that required after drying of the starch, sufficient air-dried starch is added to raise the moisture content of the mixture to within the proper range. The starch is then acidified in a closed vessel, preferably a mixing drum rotatably supported on hollow trunnions. Preferably, hydrogen chloride gas, although other catalyst such as sulfur dioxide or sulfur trioxide when in a dry gaseous state may be used, is introduced into the drum through one of the hollow trunnions and is mixed with the starch. Air or other inert gas is also introduced through the trunnion at a sufficient rate to sweep the hydrogen chloride into the drum and to dilute it in the ratio of about 1 to 3 parts by volume. Starch, if it contains the small amount of moisture specified, absorbs a sufficient quantity of hydrogen chloride (0.1 to 0.4 percent) for dextrinization.

The acidity of the starch after treatment may be determined by titrating a water suspension of 5 grams of the sample with tenth normal sodium hydroxide, using phenolphthalein as the indicator.

If desired, the mixing drum can also be used as the roasting oven, introducing the catalyst during the roasting process.

The use of the large volume of hydrogen chloride rather than the small volume of liquid catalyst facilitates the uniform distribution of catalyst throughout the large volume of starch. Using air to dilute the hydrogen chloride further increases the volume, and lowers the concentration of the active constituent, thus preventing too rapid absorption of the hydrogen chloride by the starch.

Predrying of the starch to the correct moisture content of substantially 1 to 4 percent is necessary if the catalyst is to be introduced as a gas. For example, if air-dried starch containing 8 to 20 percent moisture is treated with hydrogen chloride, the starch absorbs the hydrogen chloride so rapidly that most of it is absorbed on the surface of the mass. Such moist starch swells slightly on coming into contact with the gas, and there is a tendency to form a crust of acidified starch on top of the bulk of starch. However, if the moisture content of the starch is lowered to 1 to 4 percent, the affinity between the starch and gas is reduced sufficiently so that a uniform mixture is readily obtained. In fact, if the starch has a near-zero moisture content, there is practically no absorption of hydrogen chloride, whence the necessity of a lower limit on the moisture content.

Having thus described the invention, what is claimed is:

1. In the dextrinization of starch, the method of incorporating a mineral acid catalyst into granular starch comprising drying the starch to a moisture content of from about 1 percent to 6 percent, and mixing a dry gas, which contains a gas having an affinity for water and forming a mineral acid therewith, into the starch, in such quantity and over a sufficient interval of time that the acid-forming gas is absorbed evenly throughout the starch mass in the correct quantity for dextrinization.

2. In the dextrinization of starch, the method of incorporating a mineral acid catalyst into granular starch comprising drying the starch to a moisture content of less than 1 percent to 6 percent, adding undried starch to produce a granular starch having a moisture content of about 1 percent to 6 percent, and mixing a dry gas, which contains a gas having an affinity for water and forming a mineral acid therewith, into the starch, in such quantity and over a sufficient interval of time that the acid-forming gas is absorbed evenly throughout the starch mass in the correct quantity for dextrinization.

3. In dextrinization of starch, the method of incorporating hydrochloric acid into granular starch to act as a catalyst comprising drying the starch to a moisture content of from about 1 percent to 4 percent, and mixing a dry gas, which contains hydrogen chloride, into the starch, in such quantity and over a sufficient interval of time that the hydrogen chloride will be absorbed evenly throughout the starch mass in the correct quantity for dextrinization.

4. In the dextrinization of starch, the method of incorporating hydrochloric acid into granular starch to act as a catalyst comprising drying the starch to a moisture content of from about 1 percent to 4 percent, and mixing dry hydrogen chloride gas, diluted with air in the ratio of about 1 part to 3 parts by volume, into the starch, in such quantity and over a sufficient interval of time that the gas will be absorbed evenly throughout the starch mass in the correct quantity for dextrinization.

5. In the dextrinization of starch, the method of incorporating sulfurous acid into granular starch to act as a catalyst comprising drying the starch to a moisture content of from about 1 percent to 6 percent, and mixing a dry gas containing sulfur dioxide, into the starch, in such quantity and over a sufficient interval of time that the sulfur dioxide will be absorbed evenly throughout the starch mass in the correct quantity for dextrinization.

STEWARD G. MORRIS.